H. R. ARTHUR.
BEET TOPPER.
APPLICATION FILED MAY 1, 1909.

933,687.

Patented Sept. 7, 1909.

4 SHEETS—SHEET 1.

Witnesses

Inventor
*Henry R. Arthur,*
By *Victor J. Evans*
Attorney

H. R. ARTHUR.
BEET TOPPER.
APPLICATION FILED MAY 1, 1909.

933,687.

Patented Sept. 7, 1909.
4 SHEETS—SHEET 2.

Witnesses

Inventor
Henry R. Arthur,
By Victor J. Evans
Attorney

H. R. ARTHUR.
BEET TOPPER.
APPLICATION FILED MAY 1, 1909.

933,687.

Patented Sept. 7, 1909.
4 SHEETS—SHEET 3.

Witnesses

Inventor
Henry R. Arthur;
By Victor J. Evans
Attorney

H. R. ARTHUR.
BEET TOPPER.
APPLICATION FILED MAY 1, 1909.

933,687.

Patented Sept. 7, 1909.
4 SHEETS—SHEET 4.

Inventor
Henry R. Arthur,
By Victor J. Evans.
Attorney

Witnesses

UNITED STATES PATENT OFFICE.

HENRY R. ARTHUR, OF LONGMONT, COLORADO, ASSIGNOR TO MEYER HARRISON, OF DENVER, COLORADO.

BEET-TOPPER.

933,687.  Specification of Letters Patent.  Patented Sept. 7, 1909.

Application filed May 1, 1909. Serial No. 493,339.

*To all whom it may concern:*

Be it known that I, HENRY R. ARTHUR, a citizen of the United States, residing at Longmont, in the county of Boulder and State of Colorado, have invented new and useful Improvements in Beet-Toppers, of which the following is a specification.

This invention relates to beet toppers, and has for an object to provide a machine of this character capable of being propelled across or through a field and provided in conjunction with a harvesting apparatus so that after the tops of the beets have been effectively removed or cut the beets may be drawn bodily from the ground.

A still further object of my invention is to provide a vertically movable supplemental frame connected to the main frame of the harvester and provided with a cutting knife for primary use in partly cutting the tops from the beets, and to provide upon the said vertically movable supplemental frame my improved apparatus having a topping knife adapted in a novel and simple manner to be moved into or out of its operative position and toward or away from the pressing or crushing roller which latter is carried by the main frame.

Other objects and advantages will be apparent as the nature of the invention is better set forth, and it will be understood that changes within the scope of the claims may be resorted to without departing from the spirit of the invention.

Figure 1:
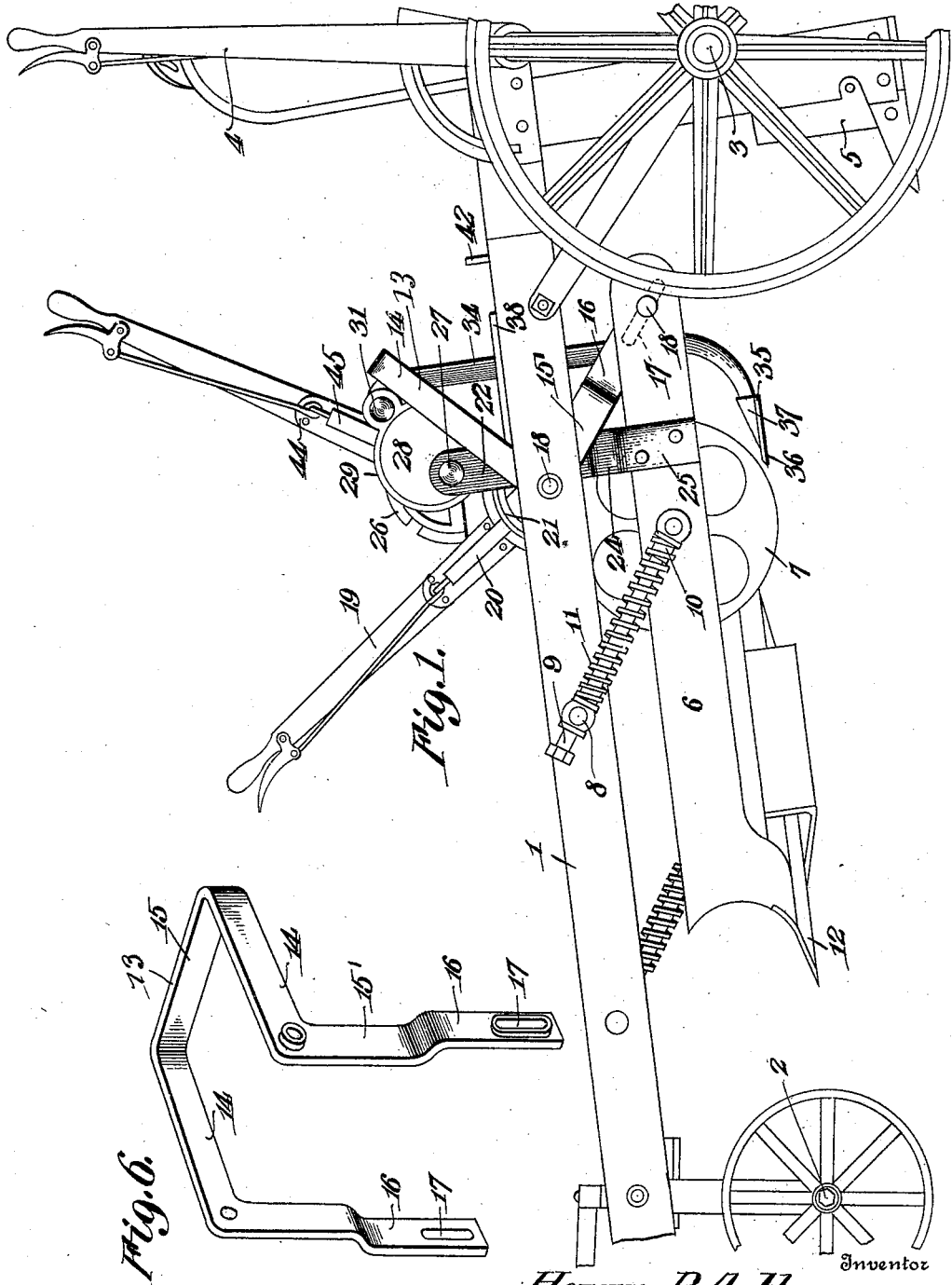
Figure 2:
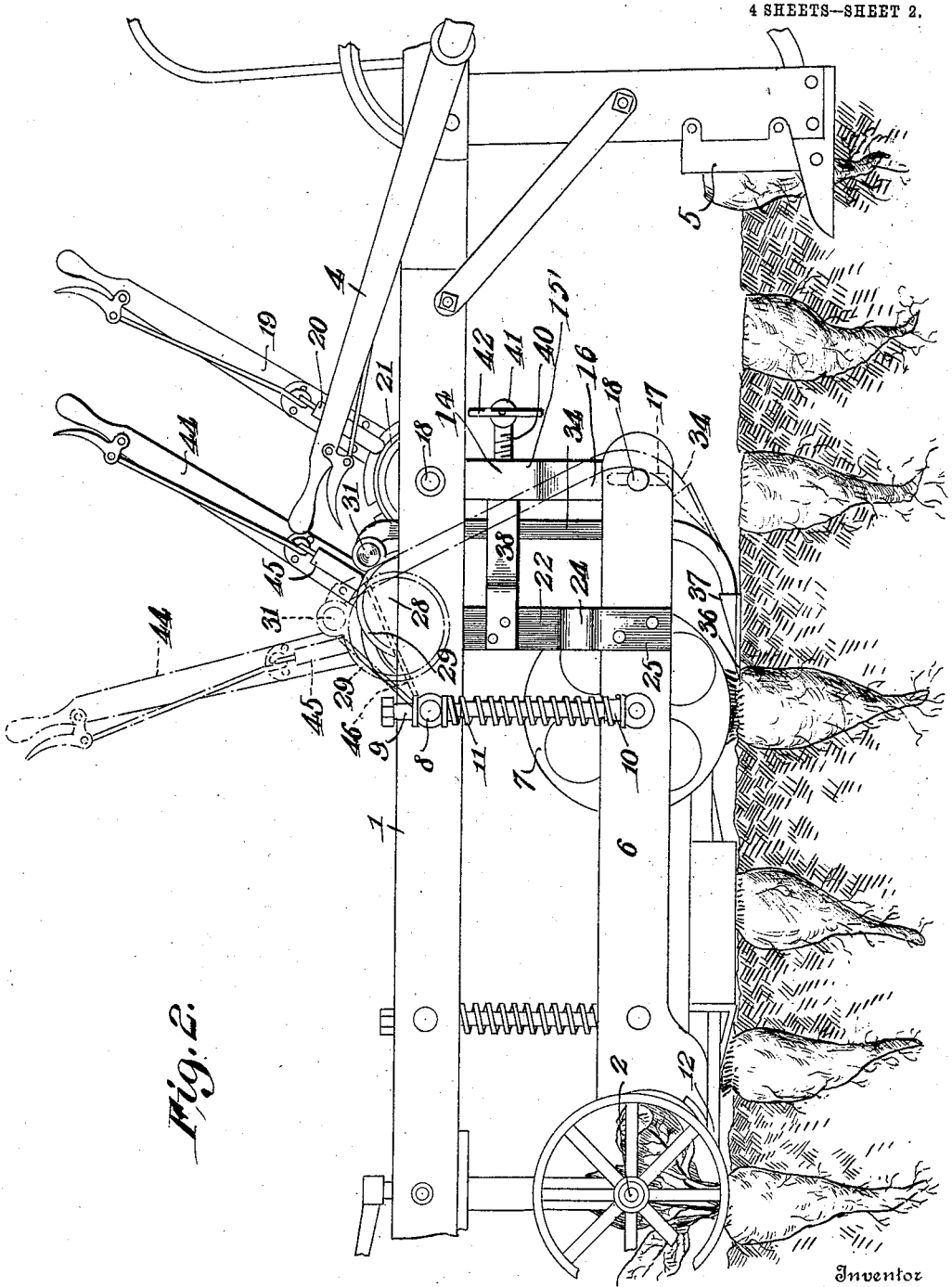
Figures 3, 7:
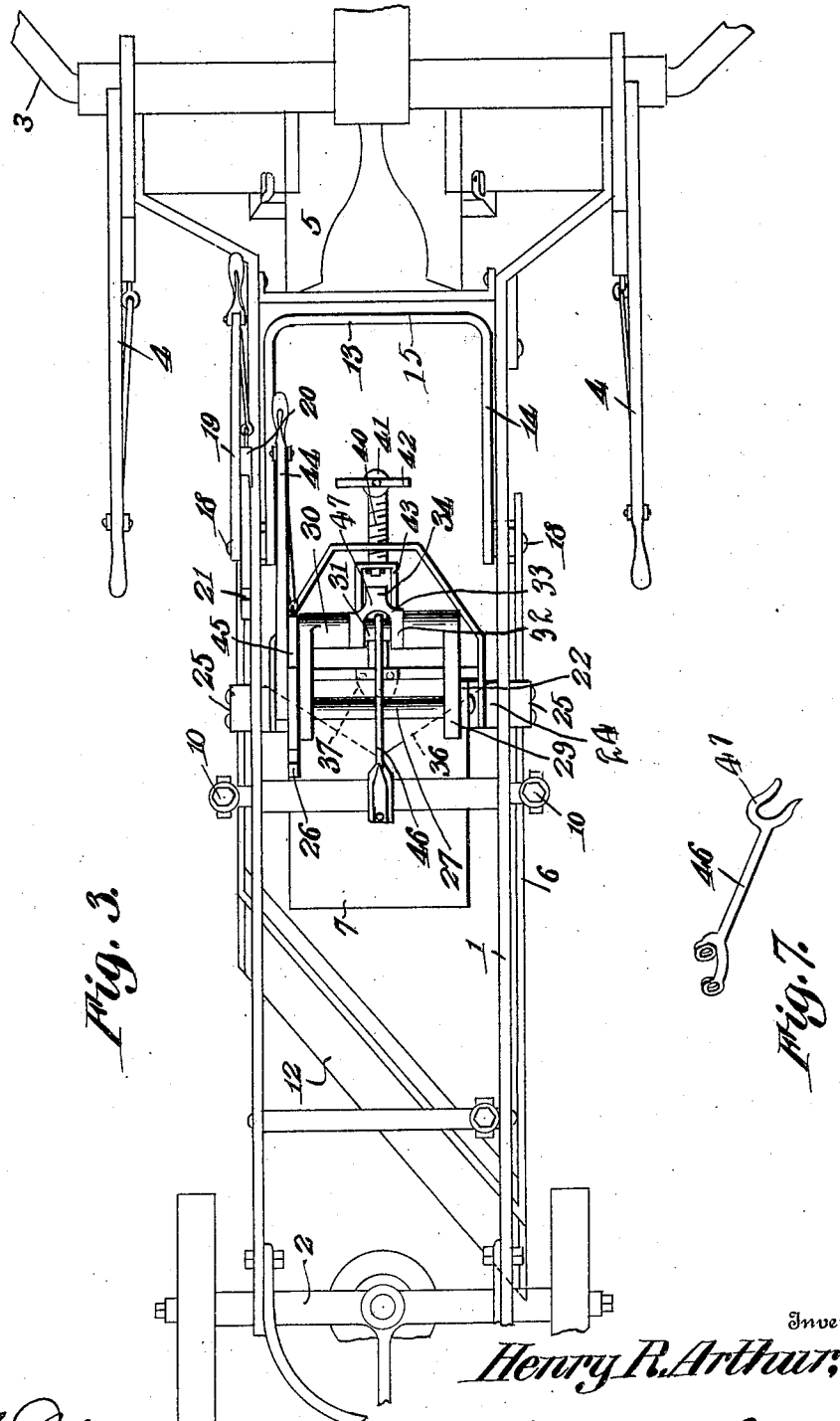
Figure 4:
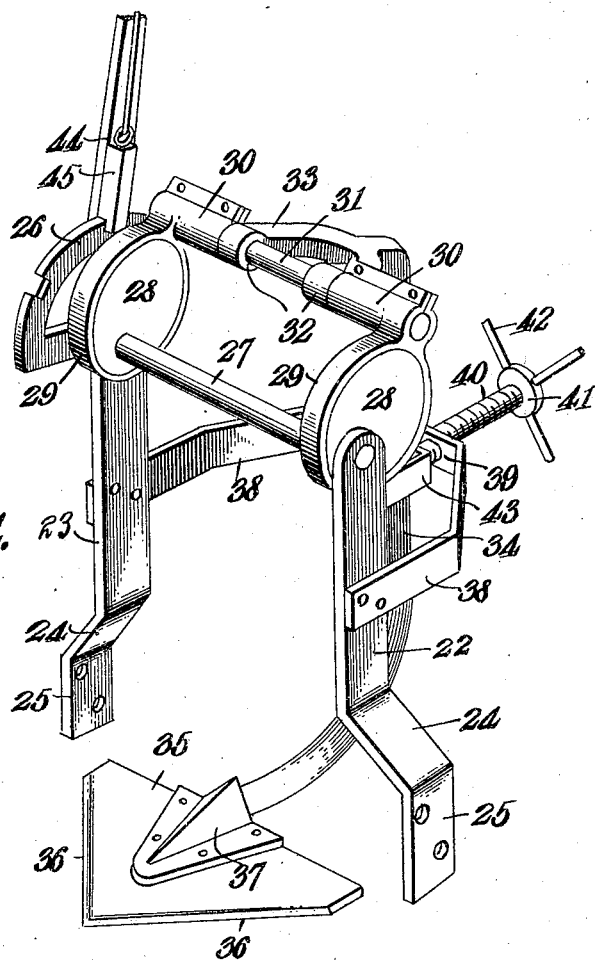
Figure 5:
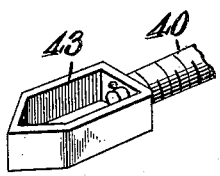

In the drawings, forming a portion of this specification and in which like numerals of reference indicate similar parts in the several views:—Figure 1 is a side elevation of a portion of a beet harvester showing my improved topper applied thereto, the frame of the harvester being in a position to cause the digging shovel and cutting knife to assume an inoperative position. Fig. 2 is a side elevation of the harvester showing the frame thereof lowered to bring the collecting shovel and the cutting knife into an operative position. Fig. 3 is a top plan view of the harvester and the topping apparatus. Fig. 4 is a detail perspective view of the topping apparatus removed from the supplemental frame of the harvester. Fig. 5 is a detail perspective view of the guide element carried by the adjusting screw. Fig. 6 is a detail perspective view of the supplemental frame supporting yoke. Fig. 7 is a detail perspective view of the extracting shaft engaging arm.

Referring now more particularly to the drawings, there is shown a beet harvester comprising a rectangular main frame 1 mounted at its front end upon a wheeled axle 2 and at its rear end upon a wheeled axle 3. The rear axle 3 may be of the form shown in the Patent Number 760,412, of May 24, 1904, and may be operatively connected to a lever 4 so that the main frame can be angularly adjusted to move the rear end toward or away from the surface of the ground. Adjacent to the axle 3 the frame 1 is provided with a digging shovel 5 which may also be constructed in the manner shown in the patent previously mentioned. The main frame of the harvester is provided therebeneath with a supplemental frame 6 with which is revolubly connected a crushing roller 7. The side bars of the frame 1 are provided with swivel or pivotally mounted members 8 having loosely mounted therein portions of suspending rods or the like 9 which are pivoted as clearly shown at their lower ends to the side bars of the supplemental frame 6. The rods 9 have mounted thereon stop collars 10 and confined between the collars and the swivel members 8 are coiled expansible springs 11 arranged to yieldingly hold the supplemental frame downward to its work as will be readily understood. The supplemental frame is provided at its forward end with a knife 12 which extends obliquely with respect to the main frame as shown in Fig. 3 of the drawings. A supplemental frame supporting yoke 13 is provided and carries a pair of spaced arms 14 which are connected to each other by a bar 15 and as shown the arms 14 are provided with angularly disposed legs 15′ having offset lower extremities 16 which are slotted longitudinally as at 17 to receive pivot pins 18 adjacent to the rear ends of the side bars of the supplemental frame 6. The arms 14 are mounted upon revoluble pins 18 carried by the side bars of the main frame of the harvester. One of the said pins 18 has secured thereto an operating lever 19 provided with a dog 20 for engaging the rack segment 21 upon the main frame. The construction just described is such that the lever 4 can be actuated so as to dispose the main frame of the harvester at an angle with respect to the surface of the ground as shown in Fig. 1 of the drawings, thus moving the digging shovel 5 upwardly away from the surface of the ground and into an inoperative position. After this operation the lever 19 can be actuated so as to elevate the supplemental frame 6 to throw the primary cutting knife 12 upwardly away from the ground and into an inoperative position. It will be apparent that the construction provides means whereby the operative parts of the harvester can be conveniently and effectively moved into such position as will permit the machine in going off the field to travel without the said operative parts coming in contact with obstructions.

The supplemental frame 6 is provided adjacent to its rear end with vertically extending standards 22 and 23 preferably provided with offset portions 24 at their lower ends from which depend vertical portions 25 which may be secured to the side bars of the frame 6 by rivets or other suitable fastening devices. The standard 23 is provided at its upper end with a rack segment 26, and beneath the segment the standard revolubly supports one end of a horizontal shaft 27, the other end of the said shaft being revolubly mounted in the standard 22. The shaft 27 has secured thereto a pair of eccentrics 28 upon which straps 29 are mounted. The straps 29 are provided with bearing boxes 30 in which a shaft 31 is mounted, and as shown this shaft receives the journal boxes or bearing portions 32 of the forked arms 33 at the upper end of a shank 34. The shank 34 has its lower end curved inwardly toward the front end of the harvester and has secured thereto in any suitable manner a topping knife 35 which in this instance is provided with beveled cutting edges 36 and upon its upper surface with a sweep or deflector 37 having downwardly inclined side portions as clearly indicated in Fig. 4 of the drawings. The standards 22 and 23 have secured thereto the forward ends of a yoke 38 provided with a portion 39 with which is engaged an adjusting screw 40 provided at one end with a crank wheel 41 having a series of radial arms 42 adapted to be operated by the foot of the operator of the harvester so as to actuate the screw. The forward end of the screw 40 has secured thereto a hollow guide element 43 which receives a portion of the vertical shank 34. The shaft 27 has secured thereto an operating lever 44 provided with a dog 45 adapted to engage the teeth of the rack segment 26 so as to hold the knife 35 in its vertically adjusted position.

The principal features of operation of the harvester proper having been herein fully explained will be sufficient to enable it to be obviously seen that the topping apparatus will be raised and lowered upon corresponding movement of the supplemental frame 6. In operation the primary knife 12 will partly sever the tops of the beets from the remaining portions thereof, and upon movement of the machine the cut tops will be crushed by the roller 7 in an efficient and novel manner. The topping knife 36 which is carried by the shank 34 is positioned directly behind and partly beneath the crushing roller and upon properly actuating the lever 44 the said knife can be raised or lowered vertically independently of the supplemental frame 6 so as to effect the desired cut. Should it be desired to move the topping knife 35 closer to the crushing roller 7 or slightly farther beneath the same the screw 40 can be operated to effectively move the shank 34 in the desired direction with the shaft 31 as the pivot for the shank. The main frame 1 of the harvester is provided with a pivotally mounted arm 46 which has a forked rear end 47 which straddles a portion of the shaft 31 at a point between the boxes 32. A leaf spring or similar elastic connection is employed in conjunction with the arm 46 and is arranged to bear thereupon so as to prevent possible vibratory movement of the cutting apparatus and to hold it in its adjusted position.

I claim:—

1. The combination with a wheeled frame mounted for angular movement toward or away from the surface of the ground, of a supplemental frame carried by the main frame adapted to be adjusted to lie in parallel relation to the wheeled frame, a knife at the front end of the supplemental frame, a crushing roller carried by the supplemental frame, an adjustable topping knife carried by the supplemental frame, means for adjusting the said topping knife toward and away from the roller, and a digging shovel carried by the wheeled frame and disposed rearwardly of the topping knife.

2. A machine of the class described comprising a wheeled frame, means for adjusting the frame angularly with respect to the surface of the ground, a supplemental frame carried by the main frame, yieldable means connecting the main frame with the supplemental frame, means for adjusting the supplemental frame toward or away from the main frame, a knife carried by the supplemental frame, a roller disposed rearwardly of the knife, and a topping apparatus carried by the supplemental frame and adapted to be independently adjusted so as to be moved toward or away from the roller.

3. A machine of the class described comprising a wheel frame provided at its rear end with a digging shovel, a supplemental frame carried by the main frame and disposed beneath the same, a knife carried by the supplemental frame, a crushing roller carried by the supplemental frame and disposed rearwardly of the knife, a shovel disposed rearwardly of the crushing roller, and means carried by the supplemental frame for operating the last named knife to move the same into its operative or inoperative position.

4. A machine of the class described comprising a wheeled frame provided at its rear end with a digging shovel, a supplemental frame disposed beneath the wheeled frame and located forwardly of the said digging shovel, a crushing roller carried by the supplemental frame, a primary topping knife carried by the supplemental frame and disposed forwardly of the crushing roller, and an angularly adjustable topping knife carried by the supplemental frame and disposed rearwardly of the crushing roller.

5. A machine of the class described comprising a wheeled frame, a digging shovel carried by the frame, a supplemental frame disposed beneath the wheeled frame and provided at its forward end with a cutting knife, a roller carried by the supplemental frame, standards extending upwardly from the supplemental frame, a shaft carried by the standards, eccentrics upon the shaft, a shank supported upon the shaft, a topping knife carried by the shank and disposed rearwardly of the roller, and means for operating the shaft so that the shank can move angularly to bring the said topping knife into its operative or inoperative position.

6. A machine of the class described comprising a wheeled frame, a digging shovel carried by the frame, a supplemental frame depending from the wheeled frame and located forwardly of the digging shovel, a topping apparatus carried by the supplemental frame, a crushing roller carried by the supplemental frame, an eccentrically operated topping knife disposed rearwardly of the crushing roller and adapted to be moved toward or away from the same.

7. A machine of the class described comprising a portable frame, a digging shovel carried by the frame, a crushing roller, a knife located forwardly of the crushing roller, an angularly adjustable topping knife disposed rearwardly of the crushing roller, and means adjustably connected with the said topping knife for moving the same partly beneath the said roller.

8. A machine of the class described comprising a wheeled frame, a digging knife carried by the frame, a supplemental vertically adjustable frame beneath the wheeled frame forwardly of the digging shovel, a crushing roller carried by the supplemental frame, a knife upon the supplemental frame and disposed forwardly of the crushing roller, a plurality of eccentrics carried by the supplemental frame, a topping knife supporting shank operatively connected with the eccentrics, means for actuating the eccentrics to move the topping knife supporting shank toward or away from the crushing roller, and an adjusting screw operatively connected with the said topping knife supporting shank for moving the latter toward or away from the roller so that its knife can be disposed partly beneath the said roller.

In testimony whereof I affix my signature in presence of two witnesses.

HENRY R. ARTHUR.

Witnesses:
    GEO. H. STONER,
    GEO. H. ABBOTT.